United States Patent Office 3,553,233
Patented Jan. 5, 1971

3,553,233
O-ALKYL-O-P-SUBSTITUTED PHENYL
2-THIENYL PHOSPHONOTHIOATES
Hajime Hirai, Toyonaka-shi, Keimei Fujimoto, Kyoto,
Yositosi Okuno, Nishinomiya-shi, and Taizo Ogawa,
Minoo-shi, Japan, and Hirosuke Yoshioka, Austin,
Tex., assignors to Sumitomo Chemical Company, Ltd.,
Osaka, Japan, a corporation of Japan
No Drawing. Filed Dec. 20, 1967, Ser. No. 691,990
Claims priority, application Japan, Dec. 29, 1966,
42/624; Jan. 9, 1967, 42/1,878
Int. Cl. C07d 63/12; A01n 9/36
U.S. Cl. 260—329                    5 Claims

ABSTRACT OF THE DISCLOSURE

O-lower alkyl O-p-nitro- or p-cyanophenyl 2-thienyl phosphonothioates having strong insecticidal activities, and a process for preparing said compounds by hydrogen chloride-removing reaction of O-lower alkyl 2-thienyl-phosphonochloridothioates with p-cyano- or p-nitro-phenol.

This invention relates to novel organo-phosphorus compounds. More particularly, the invention pertains to novel O-alkyl O-p-substituted phenyl 2-thienylphosphonothio-ates of the formula,

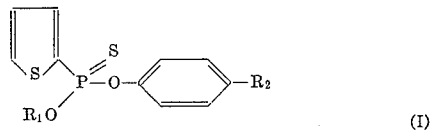

(I)

wherein $R_1$ is a lower alkyl, and $R_2$ is a nitro or cyano group, to the process for producing the same and to an insecticidal composition containing the same. The compounds of the present invention are novel compounds which have first been synthesized by the present inventors. They have markedly high insecticidal activities and are useful for the complete and advantageous prevention and extermination of agricultural injurious insects and sanitary injurious insects.

It is therefore an object of the present invention to provide novel and useful organo-phosphorus insecticides.

The novel phosphorus compounds provided in accordance with the present invention are prepared according to a process, which comprises reacting an O-alkyl 2-thienyl-phosphonochloridothioate represented by the formula,

(II)

wherein $R_1$ is as defined above, with a p-substituted phenol, or an alkali metal salt thereof, represented by the formula,

(III)

wherein $R_2$ is as defined above and M is a hydrogen atom or an alkali metal.

In practice, the above process is effected in such a manner that the O-alkyl 2-thienylphosphonochlorido-thioate of the Formula II is reacted with the para-substituted phenol of the Formula III in a suitable solvent which does not disturb the reaction, in principle, in the presence of a hydrogen chloride accepting agent such as pyridine, triethylamine or the like organic tertiary base or sodium carbonate, or is reacted with a sodium salt of the para-substituted phenol which has previously been dehydrated, whereby the phosphonothioate of the Formula I can be obtained in a high yield.

The above process may be illustrated with reference to the following reaction equations:

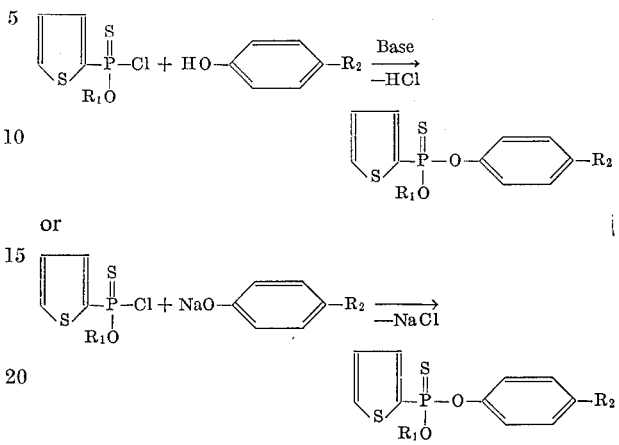

wherein $R_1$ and $R_2$ are as defined above.

The compounds of the present invention, not only have marked effects on rice crop injurious insects such as rice stem borers, leaf hoppers and plant hoppers but also show high activities towards insects belonging to the orders of Lepidoptera, Diptera and Hemiptera and towards plant parasitic mites, and are advantageously usable for the prevention and extermination of agricultural and sanitary injurious insects.

The present compounds are markedly low-toxic to mammals. For example, the toxicity of the compound represented by the formula,

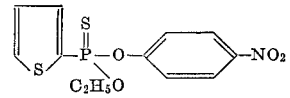

when orally administered to rice, is $LD_{50}$ (50% lethal dose) 100 mg./kg.

Of the compounds represented by the aforesaid formula, which have the above-mentioned advantages, those particularly useful for the object of the present invention are the compounds shown below, but the present invention is, of course, not limited to these.

(1)

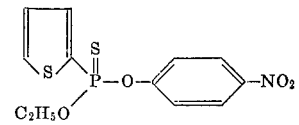

(2)

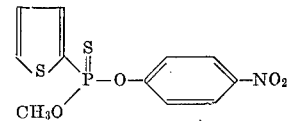

(3)

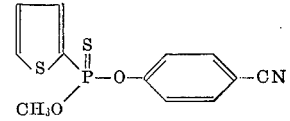

(4)

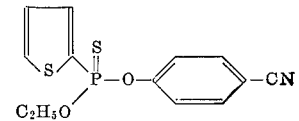

The preparation of the novel compounds of the present invention will be illustrated below with reference to examples. But it is not intended to limit the invention.

EXAMPLE 1

1.6 g. (7.1 mmol) of O-ethyl 2 - thienylphosphonochloridothioate and 1.1 g. (7.8 mmol) of paranitrophenol were added to 15 cc. of toluene. To the suspension a solution of 0.8 g. (8.0 mmol) of triethylamine in 5 cc. of toluene was added dropwise over a period of 15 minutes. During this time, the reaction temperature was maintained so as not to exceed 30° C., and after the dropwise addition of the triethylamine solution, the mixture was stirred at 55–60° C. for 3 hours. After cooling, the mixture was charged with 5% hydrochloric acid and was subjected to shaking. Thereafter, the organic layer formed was separated, was washed with 5% sodium carbonate and then with water and was dried over calcium chloride. Subsequently, toluene was removed under reduced pressure to obtain 1.8 g. of O-ethyl O-paranitrophenyl 2 - thienylphosphonothioate as a pale yellow oily substance, $n_D^{28}$ (refractive index) 1.5954.

Analysis.—Calc'd for $C_{12}H_{12}O_4NSP$ (percent): C, 43.76; H, 3.67; N, 4.25; P, 9.41. Found (percent): C, 43.90; H, 3.82; N, 4.11; P, 9.33.

EXAMPLE 2

2.3 g. (10 mmol) of O-ethyl 2 - thienylphosphonchloroidothioate and 1.4 g. (11 mmol) of paracyanophenol were added to 20 cc. of toluene. To the suspension, a solution of 1.1 g. (11 mmol) of triethylamine in 5 cc. of toluene was added dropwise at a reaction temperature of 20°–30° C. over a period of 20 minutes. After the addition, the mixture was maintained at 55°–60° C. for 2 hours and was treated in the same manner as in Example 1 to obtain 3.0 g. of O-ethyl O-paracyanophenyl 2-thienylphosphonothioate, $n_D^{22}$ 1.5978.

The oily substance was allowed to stand to become crystals having a melting point of 37.5° C. When the crystals were recrystallized from alcohol, there were obtained prism-like crystals, M.P. 41° C.

Analysis.—Calc'd for $C_{13}H_{12}O_2NS_2P$: (percent): C, 50.47; H, 3.91; N, 4.53; P, 10.01. Found (percent): C, 50.56; H, 4.05; N, 4.44; P, 10.22.

Compositions containing the present compounds as active ingredients can be formulated into any optional types such as emulsifiable concentrates, wettable powders, oil sprays, dusts, granules and ointments, according to processes thoroughly known to those skilled in the art without necessitating any special conditions, like in the case of common organo-phosphorus insecticides. They can be used in any forms as occasion demands. Further, they can be easily mixed with other active ingredients such as, for example, other organo-phosphorus insecticides, organochlorine insecticides, pyrethroid-type insecticides, such as pyrethrin and allethrin, miticides, nematocides, fungicides, herbicides, fertilizers, soil-improving agents and the like, to form multi-purpose compositions as well as to ensure or increase the effects thereof.

The formulation of the present compounds into insecticides will be illustrated below with reference to examples, but it is needless to say that the additives and mixtures employed are variable within a wide scope. In the examples, the compounds employed are represented by the numbers of the previously exemplified compounds, and all the parts and percentages are by weight unless otherwise specified.

EXAMPLE 3

25 parts of compound (1), 50 parts of benzene and 25 parts of emulsifier (mixture of polyoxyethylene nonylphenyl ether and calcium dodecylbenzene sulfonate) were mixed together in this order to obtain a homogeneous emulsifiable concentrate. On the other hand, eggs of rice stem borers were attached to a rice plant planted in a Wagner pot having a surface area of 1/50,000 of 10 ares which had elapsed 60 days after sowing, and were hatched so as to attach the rice plant. 3 days after the hatch, the rice plant was sprayed with 10 ml. per pot of an emulsion prepared by diluting the above-mentioned 50% emulsifiable concentrate with water to 2,000 times, whereby 95% of the borers which had attacked the rice plant could be killed after 3 days.

EXAMPLE 4

10 parts of compound (2) and 3 parts of emulsifier (mixture of polyoxyethylene nonylphenol ether and calcium dodecyl benzene sulfonate) were thoroughly mixed together. The mixture was added dropwise to 87 parts of 300 mesh talc (Tyler standard size), which was under thorough stirring in a mortar, and the mixture was thouroughly stirred to obtain a wettable powder. To cowpea plants parasitized with the ordinary two spotted spidermite (Tetranychus telarius) was sprayed 10 ml. per plant of a solution prepared by diluting with water to 100 times the above-mentioned 10% wettable powder, whereby 100% of the mites could be killed after 48 hours.

EXAMPLE 5

5 parts of compound (3), 5 parts of xylene and 90 parts of kerosine were thoroughly mixed together to form an oil preparation. 20 cc. per square meter of said 5% oil preparation was sprayed to a breeding place larvae of house fly, whereby the breeding larvae of house fly was substantially prevented.

EXAMPLE 6

3 parts of compound (4) was dissolved in 20 parts of acetone. The solution was thoroughly mixed with 97 parts of 200 mesh (Tyler standard size) talc, and acetone was removed to obtain a homogeneous dust.

On the other hand, eggs of rice stem borers were attached to a rice plant planted in a Wagner pot having a surface area of 1/50,000 of 10 ares which had elapsed 60 days after sowing, and were hatched so as to attack the rice plant. 3 days after the hatch, the above-mentioned 3% dust was dusted onto the rice plant by use of a bell jar duster. After about 30 seconds, the pot was taken out, and more than 95% of the borers could be killed after 3 days.

EXAMPLE 7

25 parts of compound (4), 50 parts of xylene and 25 parts of emulsifier (a mixture of polyoxyethylene nonylphenol ether and calcium dodecyl benzene sulfonate) were mixed together in this order to obtain a homogeneous emulsifrable concentrate.

To cowpea plants parasitized with the ordinary two spotted spider mites (Tetranychus telarius) was sprayed 20 ml. per plant of an emulsion prepared by diluting the above-mentioned emulsifiable concentrate with water to 1000 times, whereby 100% of the spider mites could be killed after 4 days.

EXAMPLE 8

5 parts of compound (2) was mixed with 3 parts of emulsifier (a mixture of polyoxyethylene nonylphenol ether and calcium dodecyl benzene sulfonate), 90 parts of 200-mesh talc and 2 parts of polyvinyl alcohol. After kneading with a small amount of water, the mixture was granulated by means of a granulator and was then dried to obtain a granular preparation.

1 g. of the above-mentioned 5% granular preparation was sprinkled over a soil in which cowpea plants parasitized with the ordinary two spotted spider mites (Tetranychus telarius) had been planted, whereby 100% of the spider mites could be killed after 48 hours.

What is claimed is:

1. A novel organo-phosphorus compound represented by the formula,

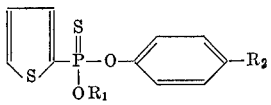

wherein $R_1$ is a lower alkyl, and $R_2$ is nitro or cyano group.

2. A novel organo-phosphorus compound represented by the formula,

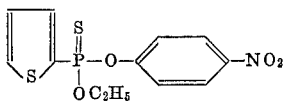

3. A novel organo-phosphorus compound represented by the formula,

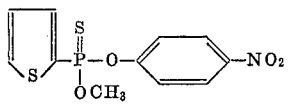

4. A noval organo-phosphorus compound represented by the formula,

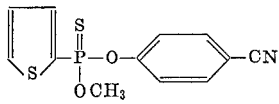

5. A novel organo-phosphorus compound represented by the formula,

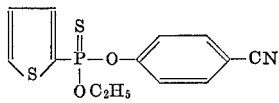

References Cited

UNITED STATES PATENTS

| | | | |
|---|---|---|---|
| 2,503,390 | 4/1950 | Jelinek | 167—30 |
| 2,957,007 | 10/1960 | McCall et al. | 260—332.5 |
| 2,964,528 | 12/1960 | Wicker et al. | 260—294.8 |
| 3,308,016 | 3/1967 | Kuramoto et al. | 167—30 |

OTHER REFERENCES

Japan Pat. No. 4750 (1965), abstracted in CA 62: 16299, June 21, 1965.

NORMA S. MILESTONE, Primary Examiner

C. M. SHURKO, Assistant Examiner

U.S. Cl. X.R.

424—202